April 28, 1931. H. JUNKERS 1,802,720
VALVE
Filed Dec. 1, 1928
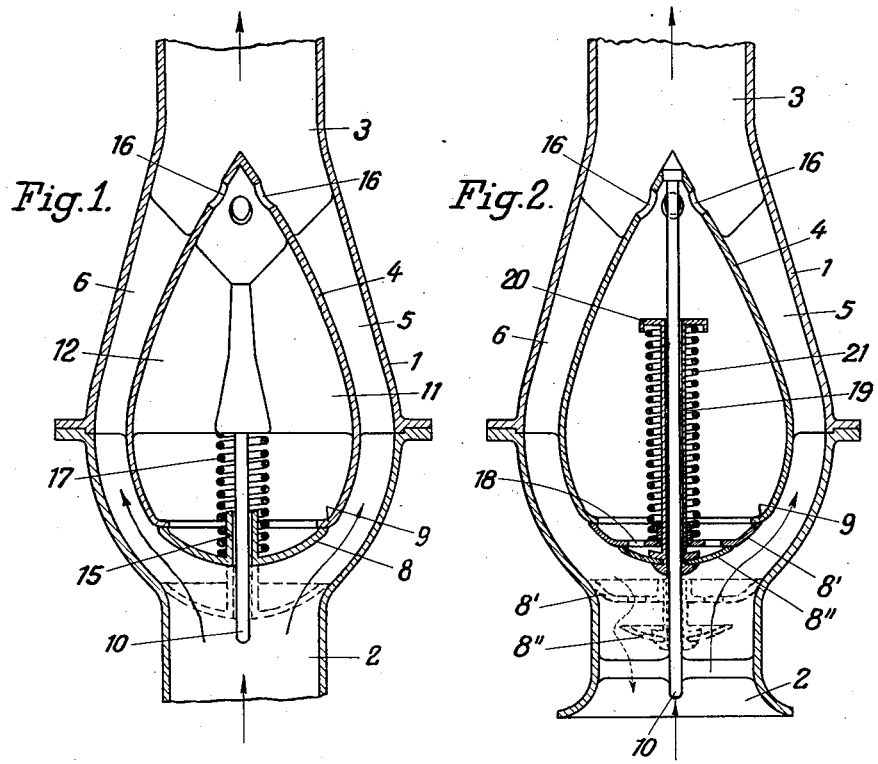
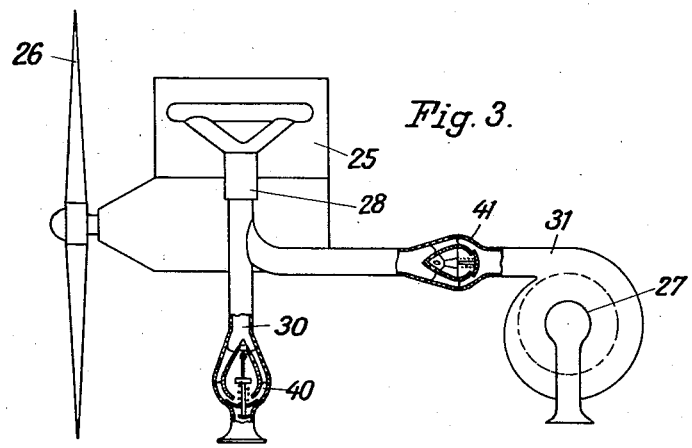
Inventor:
Hugo Junkers
by Kennehane
Atty.

Patented Apr. 28, 1931

1,802,720

UNITED STATES PATENT OFFICE

HUGO JUNKERS, OF DESSAU, GERMANY

VALVE

Application filed December 1, 1928, Serial No. 323,135, and in Germany January 26, 1928.

My invention refers to valves and more especially to the kinds of valves which are inserted in gas or liquid conduits and are automatically operated by the passing medium.

It is an object of my invention to provide a valve of this kind, which is more efficient and reliable in use and simpler in construction than similar valves hitherto designed.

In valves of this kind the movable part or valve disc has already been formed as a sphere or a streamlined body in order to thus reduce the resistance to the passage of the medium. However, a valve disc of this form will be comparatively large and weighty so that it is less efficient than an ordinary plate-shaped disc whenever low weight of the movable part is essential, for a greater weight of the valve disc acts towards retarding its movements and therefore frequently requires comparatively strong return springs, which again require a correspondingly great difference of pressure of the medium in front and at the rear of the valve.

In the valve according to the present invention a disc of particularly light weight is provided, this disc being formed as a comparatively shallow bowl forming the movable front part of a stationary streamlined body, the diameter of the bowl-shaped disc being smaller than the largest diameter of the stationary streamlined body, its axial height being small as compared with the axial height of the stationary body.

I prefer forming the casing surrounding both these parts with streamlined inner walls, which are spaced all around from the stationary streamlined body. In this body I prefer providing longitudinal passages which allow the reduction of pressure arising at the rear of this body to be transmitted to the rear side of the valve disc applied to the body, this reduction of pressure being thus utilized for assisting in the lifting and holding of the disc in the lifted position. Inversely, whenever the medium should flow backwards, the pressure above normal created thereby can be transmitted through these conduits to the valve, forcing same back onto its seat. In consequence of this suction and pressure effect exerted through the hollow of the stationary body on the valve disc, valve springs may as a rule be dispensed with altogether, more especially in the case where the valve axis extends vertically and the medium passes through the valve upwardly.

I may apply the same principle to double valves in which the flowing medium does not encounter any appreciable resistance when flowing in one direction, while in the other direction its flow is possible only against a comparatively great resistance. A double valve of this kind may for instance act as an ordinary check valve in one direction and as a safety valve in the other, if an inadmissible pressure should occur to the rear of the check valve.

Valves according to this invention are used to great advantage in the air and mixture supply conduits of internal combustion engines. Owing to the simple design they are very reliable in operation and the very small resistance offered to the passage of the flowing medium does not lead to throttling which might appreciably impair the output of the engine.

In the drawings affixed to this specification and forming part thereof two valves embodying my invention are illustrated diagrammatically by way of example.

Figs. 1 and 2 being axial sections of a single and a double valve, respectively.

Fig. 3 is a diagrammatic view partly in axial section of valves as shown in Figs. 1 and 2 applied to an internal combustion engine.

Referring first to Fig. 1, 1 is the pear-shaped valve casing, the inner wall of which has streamline form and 2 and 3 are the inlet and outlet respectively. 4 is the hollow streamlined body, fixed in position in the casing 1 by means of radial ribs 5 and 6. This stationary body 4 is supplemented as to its streamline form by the valve disc 8, which is shown as a shallow bowl, the free edge of which applies itself onto the free edge of the aperture of the stationary body 4. The valve disc 8 is provided with a sleeve 15 embracing the stem 10, which is fixed in axial position in the hollow stationary body 4 by means of radial ribs 11 and 12. The valve disc 8 is free to move axially on the stem 10 and in its outer end position applies itself onto the valve seat 50 formed near the inlet 2 of the casing, thereby closing the valve. Near the rear point of the stationary body 4 are provided apertures 16 which allow the reduction of pressure occurring at this point to be transmitted across the hollow of the body 4 onto the rear side (inner side) of the valve disc 8. This disc may be made of thin sheet metal and its weight may therefore be so small that it is capable of very quickly following the variations of pressure and velocity in the flowing medium, thereby as a rule rendering a valve spring superfluous. For special cases, more especially if the medium flows through the valve from above or in horizontal direction, a weak spring 17 may be provided.

In the modification illustrated in Fig. 2 the casing 1 and stationary streamlined body 4 are formed substantially as shown and described with reference to Fig. 1. The valve disc is here formed in two sections 8' and 8", the part 8' having substantially the form of a shallow tray with apertures 18 in the bottom, while the end disc 8" has the form of a shallow bowl. The two parts 8' and 8" together supplement the stationary body 4 as to its streamline form. The disc 8" is mounted on the end of a sleeve 19 having a flange 20 at the free end and a coil spring 21 is inserted between this flange and the bottom of the intermediate part 8', this spring tending to hold the disc 8" applied against the part 8'.

As a rule this valve will act exactly like the valve shown in Fig. 1, the two parts 8' and 8" being held applied against each other by the spring 21 and acting in the same manner as the springless disc 8 in Fig. 1. However, if the pressure in the outlet portion 3 of the casing should be greater than the pressure in the inlet portion 2, the difference of pressure will be transmitted through the apertures 16 and the interior of the hollow streamlined body 4 onto the bottoms of the combined parts 8', 8", forcing same into the outer end position, where the part 8' is applied against the valve seat 50, the part 8" being held applied against 8' by the spring and thus closing the apertures 18 provided therein. When the difference of pressure should overcome the tension of spring 21, disc 8" will be forced away from part 8', assuming the position shown in dotted lines and the pressure can now be equalized as shown by the dotted arrow, whereupon spring 21 will again pull disc 8" towards the part 8', the valve now acting again as an ordinary check valve.

Fig. 3 illustrates the use of valves of this kind in the operation of an internal combustion engine 25 driving a propeller 26, the engine being supplied with air of combustion either directly from the atmosphere or through a compressor 27. In this case it is usual to mount the carbureter 28 between the compressor and the engine and two conduits then lead to the carbureter, a conduit 30 for the supply of air from the atmosphere and a conduit 31 for connection with the compressor. In the conduit 30 is preferably inserted a valve 40 of the kind shown in Fig. 2, while in the conduit 31 is inserted a valve 41 as shown in Fig. 1. The valve 41 serves the purpose of preventing the entrance of flames and creation of pressure above normal atmospheric pressure in the compressor 27 whenever backfiring should occur in the carbureter. The double valve 40 automatically closes the conduit 30 towards the outside whenever the compressor 27 is operated, but it also enables air to be sucked in directly with the least possible resistance to its passage and further protects the conduit against any injurious pressure above the normal. To this end the spring 21 shown in Fig. 2 is made strong enough to counteract the pressure produced in the compressor but to give way and open the conduit whenever owing to misfire a higher pressure should occur in the carbureter and in the conduits connected to it.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A valve comprising a valve casing having an inlet and an outlet, a valve seat formed in said casing near the inlet, a partly streamlined body fixed within said casing its broader part adjoining the inlet, said body being spaced from the inner walls thereof to leave a passage, and a valve disc movable in the axial direction of the valve and having the form of a comparatively shallow bowl capable of applying itself in one end position onto the valve seat and against said streamlined body in the other, so as to supplement the missing streamlined portion of the broader part of said body.

2. A valve comprising a valve casing having an inlet and an outlet, a valve seat formed in said casing near the inlet, a partly streamlined body fixed within said casing, its broader part adjoining the inlet, said body being spaced from the inner walls thereof to leave a passage, and a valve disc movable in the axial direction of the valve and having the form of a comparatively shallow bowl capable of applying itself in one end position onto the valve seat and against said streamlined body in the other, so as to supplement the missing streamlined portion, the diameter of said disc being somewhat smaller than the largest diameter of said streamlined body.

3. A valve comprising a valve casing having an inlet and an outlet, a valve seat formed in said casing near the inlet, a partly streamlined body fixed within said casing and spaced from the inner walls thereof to leave a passage, a valve disc movable in the axial direction of the valve and having the form of a comparatively shallow bowl capable of applying itself in one end position onto the valve seat and against said streamlined body in the other, so as to supplement the missing streamlined portion and stationary centrally located means connected with said body for guiding said disc.

4. A valve comprising a valve casing having an inlet and an outlet, a valve seat formed in said casing near the inlet, a hollow partly streamlined body fixed within said casing and spaced from the inner walls thereof to leave a passage, said body having an aperture near the end adjoining the outlet, and a valve disc movable in the axial direction of the valve and having the form of a comparatively shallow bowl capable of applying itself in one end position onto the valve seat and against said streamlined body in the other, so as to supplement the missing streamlined portion.

5. A valve comprising an inwardly substantially streamlined valve casing, having an axially disposed inlet and outlet, a valve seat formed in said casing near the inlet, a hollow partly streamlined body fixed within said casing and spaced from the inner walls thereof to leave a passage, said hollow body having an opening facing the inlet and an opening facing the outlet of said casing, a valve disc movable in the axial direction and having the form of a comparatively shallow bowl capable of applying itself in one end position onto the valve seat and in the other against the open end of said hollow body to close same and to supplement the missing streamlined portion thereof, and means for guiding said disc.

6. A valve comprising a valve casing having an inlet and an outlet, a valve seat formed in said casing near the inlet, a partly streamlined body fixed within said casing and spaced from the inner walls thereof to leave a passage, a valve disc movable in the axial direction of the valve and having the form of a comparatively shallow bowl capable of applying itself in one end position onto the valve seat and against said streamlined body in the other, so as to supplement the missing streamlined portion, means connected with said body for guiding said disc and a spring acting on said disc.

7. A valve comprising a valve casing having an inlet and an outlet, a valve seat formed in said casing near the inlet, a partly streamlined body fixed within said casing and spaced from the inner walls thereof to leave a passage and a valve disc in two parts, the larger one having the cross-section of a shallow apertured tray, the smaller one having the form of a shallow bowl, the two discs being axially movable, means for guiding said discs and a spring for holding the smaller part of said disc applied against said larger part.

In testimony whereof I affix my signature.
HUGO JUNKERS.